L. G. COPEMAN.
ELECTRICALLY HEATED OVEN CONSTRUCTION.
APPLICATION FILED JULY 28, 1911.
1,050,105.  Patented Jan. 14, 1913.
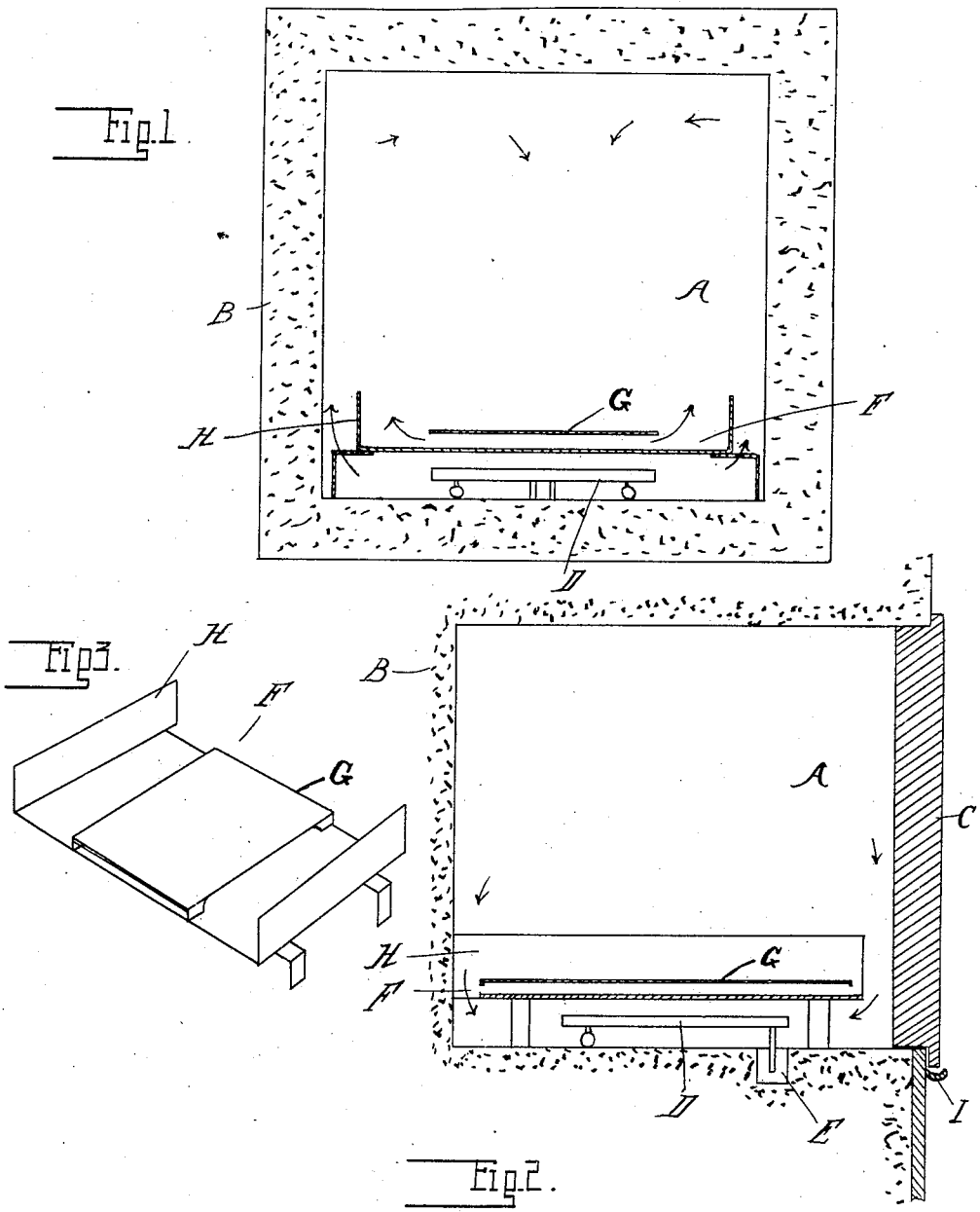

UNITED STATES PATENT OFFICE.

LLOYD GROFF COPEMAN, OF FLINT, MICHIGAN, ASSIGNOR TO THE COPEMAN ELECTRIC STOVE COMPANY, OF FLINT, MICHIGAN, A CORPORATION OF MICHIGAN.

ELECTRICALLY-HEATED OVEN CONSTRUCTION.

1,050,105.  Specification of Letters Patent.  Patented Jan. 14, 1913.

Application filed July 28, 1911. Serial No. 641,002.

*To all whom it may concern:*

Be it known that I, LLOYD GROFF COPEMAN, a citizen of the United States of America, residing at Flint, in the county of Genesee and State of Michigan, have invented certain new and useful Improvements in Electrically-Heated Oven Construction, of which the following is a specification, reference being had therein to the accompanying drawings.

The invention relates to electric heaters and consists in the novel construction of an electrically heated oven for cooking as hereinafter set forth.

In the drawings,—Figure 1 is a vertical longitudinal section through the oven; Fig. 2 is a cross section therethrough; and Fig. 3 is a perspective view of the shield detached.

A is the oven chamber which is preferably surrounded with suitable heat insulation indicated at B, and at the front is provided with a door C.

D is an electric heater preferably in the form of a flat plate or disk arranged at the bottom of the oven and provided with a suitable socket connection E through which the current is supplied.

To avoid burning of the food at the bottom, due to the direct radiation from the heating unit, a shield F is arranged to extend thereover. This shield is preferably formed of sheet metal extending to cover the greater portion of the area of the oven bottom and preferably provided at its ends with upturned flanges H. There is also preferably a second plate or shield G separated from the plate F and having open ends. This arrangement not only prevents burning at the bottom but also is a means of heating the upper part of the oven so as to obtain a proper cooking effect at the top. Thus the air between the heating unit D and the shield F is raised to a relatively high temperature and will pass laterally to the edges of the shield and then upward, being displaced by the cooler air at the top of the oven passing downward as indicated by the arrows. It will be noted that the hot air currents pass upward at the sides of the oven without impinging directly upon the food which is above the shield G. On the other hand the fact that the oven chamber is not vented necessitates the downward movement of air in the top of the oven chamber to replace the heated air in contact with the unit, the final result being that the hot air which passes upward at the sides is drawn downward in the center. By properly proportioning the parts the temperature of the oven may be regulated so as to have practically a uniform heating effect above and below the food.

As has been stated, the oven chamber A is completely closed when the door C is shut, and consequently all steam and vapor from the cooking food is retained. This causes more or less condensation upon the walls of the oven and particularly upon the door and there is danger of this leaking out and causing an objectionable drip. To avoid such a result I have provided a drip trough or receptacle I at the front edge of the oven bottom which will catch all leakage.

What I claim as my invention is:

1. The combination with a closed oven, of a flat electrical heater arranged at the bottom thereof, and a shield comprising spaced parallel plates arranged above said heater, for the purpose described.

2. The combination with a closed oven and an electric heater therein, of a narrow drip trough extending longitudinally beneath the forward edge of the oven bottom to receive the condensation.

3. The combination with an oven and an electric heater therein, said oven having an opening and a door for closing the same, of a drip receptacle arranged at the forward edge of the oven bottom and extending longitudinally beneath the lower edge of the door in the closed position of said door.

In testimony whereof I affix my signature in presence of two witnesses.

LLOYD GROFF COPEMAN.

Witnesses:
E. D. BLACK,
DELLA G. SMITH.

---

Copies of this patent may be obtained for five cents each, by addressing the "Commissioner of Patents, Washington, D. C."